United States Patent [19]

Brooks

[11] Patent Number: 5,145,150

[45] Date of Patent: Sep. 8, 1992

[54] VALVE WITH METAL-TO-METAL SEALING MEANS

[75] Inventor: Robert T. Brooks, Aberdeen, Scotland

[73] Assignee: Robert T. Brooks, Houston, Tex.

[21] Appl. No.: 718,791

[22] Filed: Jun. 21, 1991

Related U.S. Application Data

[63] Continuation-in-part of Ser. No. 567,737, Aug. 15, 1990, abandoned.

[51] Int. Cl.⁵ .............................................. F16K 5/20
[52] U.S. Cl. .................................. 251/188; 251/192; 251/315
[58] Field of Search ............... 251/163, 188, 192, 298, 251/315, 363

[56] References Cited

U.S. PATENT DOCUMENTS

| | | | |
|---|---|---|---|
| 3,244,002 | 4/1966 | Prono et al. | 251/315 X |
| 3,765,645 | 10/1973 | Paul, Jr. | 251/188 X |
| 4,217,923 | 8/1980 | Kindersley | 251/315 X |
| 4,262,688 | 4/1981 | Bialkowski | 251/192 X |
| 4,428,561 | 1/1984 | Thompson | 251/315 X |
| 4,475,712 | 10/1984 | DeJager | 251/86 X |
| 4,962,911 | 10/1990 | Soderberg | 251/177 X |

FOREIGN PATENT DOCUMENTS 2210458 9/1973 Fed. Rep. of Germany ...... 251/192

Primary Examiner—John C. Fox
Attorney, Agent, or Firm—Donald H. Fidler

[57] ABSTRACT

A valve wherein a spherically shaped half ball element is arranged for rotation between open and closed positions with respect to a tubular seat element. Metal-to-metal sealing elements are disposed between the tubular seat and the valve body to develop an axial force in one direction when energized. A wedge element acts on the ball element to energize the metal-to-metal sealing elements and provide a rotation stop for the ball element. The ball element is truncated and attachable to a drive member which allows for shift of the ball element in open and closed positions. Metal-to-metal seals are provided throughout the valve.

29 Claims, 5 Drawing Sheets

VALVE WITH METAL-TO-METAL SEALING MEANS

This application is a continuation-in-part of U.S. application Ser. No. 567,737 filed Aug. 15, 1990 now abandoned.

RELATED APPLICATION

This application is related to a co-pending application, Ser. No. 89-05010, filed Nov. 8, 1989 and entitled: "High Pressure Pipe Coupling" and to a co-pending application Ser. No. 567,738, filed Aug. 15, 1990 and entitled "Plug Valve With Metal-To-Metal Sealing".

FIELD OF THE INVENTION

This invention relates to a form of hemi-ball valve utilizing metal-to-metal sealing elements for throughout the construction so that the valve can be utilized with corrosive liquids and is capable of a pressure seal under both static and dynamic conditions of the valve.

BACKGROUND OF THE INVENTION

Ball valves and types or forms of ball valves which utilize a valve element with a spherical sealing surface are standard available products which are designed for a number of applications. The particular invention of this application is involved with a valve using a valve element with a spherical sealing surface segment and utilizing metal-to-metal pressure sealing means for a heavy duty valve which can be utilized in oil field operations.

Typically a valve of the type contemplated by the present invention includes a hollow valve body which contains valve element rotatable about a rotation axis and provided with a spherical sealing surface. The valve element typically is rotatable through a 90° (¼ turn) for a rapid full open or closed operation. Typically, the pressure seals which are utilized to seal the trunnions on the valve element and the closures in valves are made of Hycar or Viton, a synthetic rubber material, which are satisfactory for most applications. However, in some instances metal-to-metal seals would be preferable in valves because of resistance to corrosive fluids and resistance to temperature effects which causes deterioration and failure of elastomer products. Additionally, in valves, the rotation of the trunnions relative to the elastomer seal tends to wear out the seals so that leaks occur.

With a spherical sealing surface on a valve element, a considerable number of valves utilize eccentric trunnion mountings to give leverage in providing a metal-to-metal seal between the spherical sealing surface on the valve element and the sealing seat in the valve body. However, concentrically mounted valve elements have always posed problems in sealing between the sealing surface and the sealing seat.

Metal-to-metal seals have heretofore been employed in pipe couplings for interconnecting flanges to one another. Current metal-to-metal seals in this type of use include the following.

1) The API flange—this is a widely used coupling for high pressure fluids and involves a face-to-face coupling of flanges with an interposed metal sealing member between the flanges. The metal sealing member is usually a flat faced seal that is crushed between two flat faced hubs on the flanges.

2) A "Grayloc" type connector—this connector is comprised of facing, metal seal ring, hubs and an annular clamp assembly and internal metal sealing ring resembling and inverted "T" in cross section is disposed between the hubs. The clamp assembly fits over the outer annular surface of the two facing hubs and is forced radially inward by making up the clamp bolts to draw the facing hubs together and to compress with the sealing ring rib between the hub surfaces. As the hubs are drawn together by the clamp assembly, the internal seal ring lips engage and deflect against the inner sealing surfaces on the hubs. The deflection of the seal ring lips elastically preloads the lips of the seal ring against the inner sealing surfaces of the hubs thereby forming a preloaded seal. In use, internal pressure acts on the seal ring lips so that the sealing action of the lips is both preloaded and pressure-energized. However, if the internal pressure becomes sufficiently great to cause the facing hubs to be displaced or moved longitudinally of one another, the seal ring lips will lose their sealing ability because the preloading sealing compression between the hubs and the seal is lost. Also, the metal seal ring has a 20° (sometimes 25°) bevel so that the seal lips do not radially compensate for movement of the seal lips when the hubs are spread apart from one another.

3) "Weco" wing union—this coupler has metal-to-metal compression seals disposed between connector surfaces and uses a lip type elastomer replaceable seal to protect the metal primary seal.

4) A "dynetor" connector—this is a metal-to-metal connector coupling with a reusable annular metal seal. The annular metal seal has cylindrical ends so that some longitudinal expansion or spreading between the coupling pats can occur without losing the seal in the annular seal bores.

5) The Nicholson flange—this is an annular shaped gasket which is used between flanges and flange grooves. The flange seal, when compressed between flanges, will expand with longitudinal movement but the seal will fail because the gasket expands longitudinally and thus will fail at the gap.

6) The Nicholson lip C seal—this is a seal which depends upon point contact for sealing and is a round seal.

7) The Cameron AX or CX gasket illustrated in the 1988-99 Composite Catalog, pgs 683, 685 and 826. The AX and CX gasket is a tubular member which has an external taper on each end and sealing means which engage tapered surfaces in adjoining connectors.

PATENT ART

Prior patent art includes:
U.S. Pat. 2,863,679 issued Dec. 9, 1958;
U.S. Pat. 3,628,812 issued Dec. 21, 1971;
U.S. Pat. 4,221,408 issued Sep. 9, 1980,
U.S. Pat. 4,384,730 issued May 24, 1973;
U.S. Pat. 4,408,771 issued Oct. 11, 1983; and
U.S. Pat. 4,353,560 issued Oct. 12, 1982.

THE PRESENT INVENTION

The present invention is embodied in a metal-to-metal seal system in a valve which utilizes metal sealing elements not only for sealing but also for providing energizing force to seat and to maintain the seal between a concentrically mounted spherically shaped valve element and a spherical shaped, annular valve seat in a valve body.

In the present invention, the valve element has a central spherical face between upper and lower trunnions. The spherical face has a smooth sealing surface located at a 90° rotational position relative to a flow port in the spherical face. The valve element is disposed in a valve body and rotationally mounted in the valve body so that the central spherical face is rotatable about a vertical rotational axis which intersects and is perpendicular to a horizontal central axis through inlet passages to the valve body. The spherical face contacts an annular metal sealing face on one end of a tubular seat member where the seat member is slidably mounted and centralized in the valve body with respect to the central axis. The bore through the seat member is part of the inlet flow passage. The other end of the seat member is in contact with two resilient annular metal sealing rings which are arranged to resiliently flex under an axial loading force. The annular sealing rings are loaded under an axial loading force by a wedge member which is disposed between the valve element and the valve body in a location on the side of the valve element opposite to the seat member. The wedge member serves to pre-load the spherical face of the valve element on the annular seat member in an open or closed position of the valve element. The valve element, when closed. will seal against pressure in either direction across the valve element.

In the valve assembly, metal sealing elements are employed to seal the various valve elements with respect to the valve body so that the valve contains all metal-to-metal seals.

In the present invention, the metal sealing elements provide internal and external sealing of the valve element sealing seat relative to the valve body. The arrangement of the metal seals is in conjunction with specific differential pressure areas to create a positive differential seal area between the valve element sealing surface and its sealing seat in the valve body. This produces an effect whereby when either internal or external pressure acts on the valve seat, the pressure will urge the valve seat into sealing contact with the sealing surface on the valve element.

DESCRIPTION OF THE INVENTION

Figure 1:
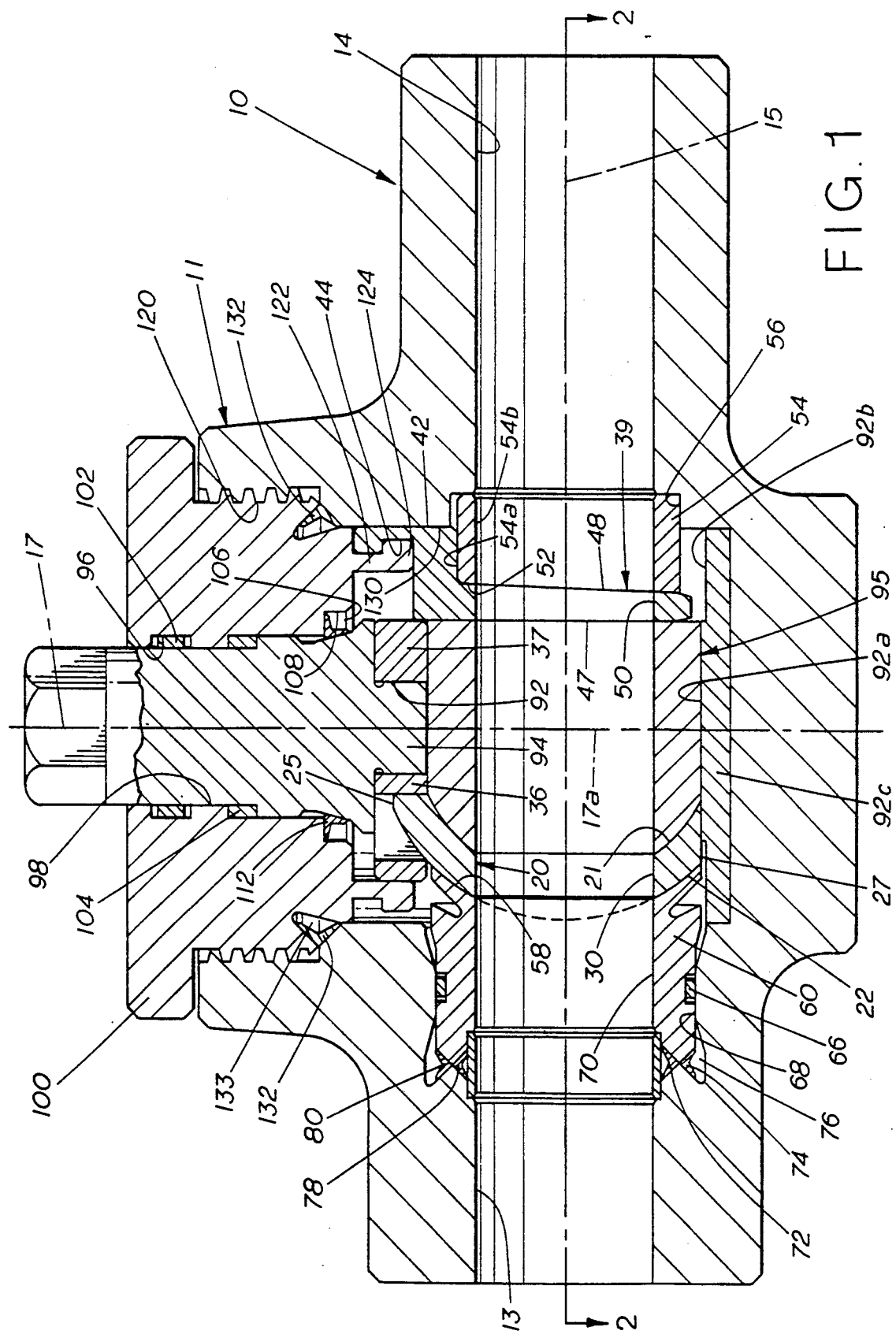
FIG. 1 is a view in longitudinal cross section through a valve in which the present invention is embodied.
Figure 2:
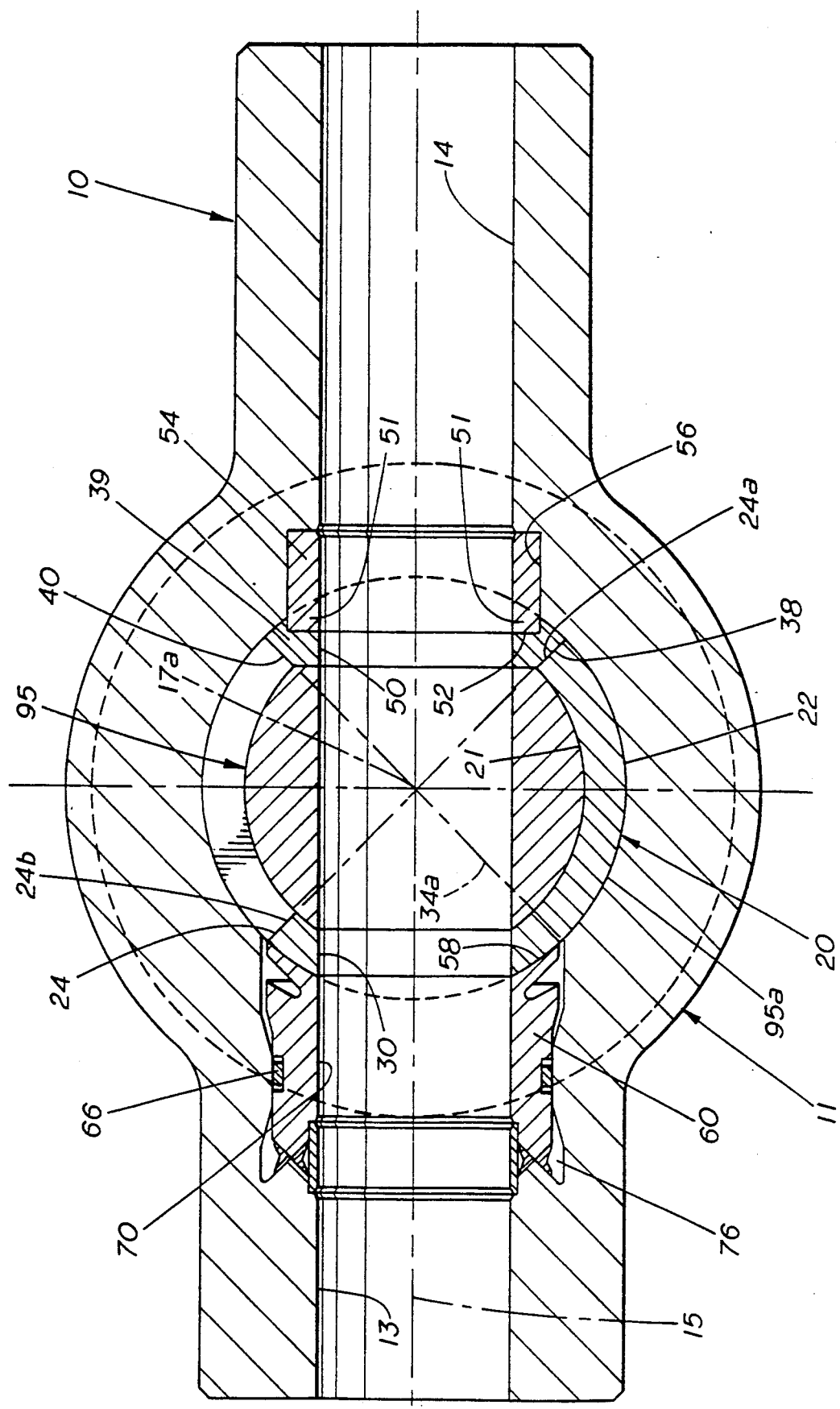
FIG. 2 is a view in horizontal cross section taken along line 2—2 of FIG. 1.

Referring now to FIG. 1 and FIG. 2, an elongated valve body 10 is illustrated with a central enlarged body portion 11. Aligned inlet and outlet passages 13,14 are located along a central horizontal axis 15 and the valve body is adapted for coupling to pipes with its passages 13,14 in fluid communication therewith for conveying liquids. The central body portion 11 has a valve chamber generally disposed about a vertical rotational axis 17. The vertical rotational axis 17 intersects the central axis 15.

Figure 3:
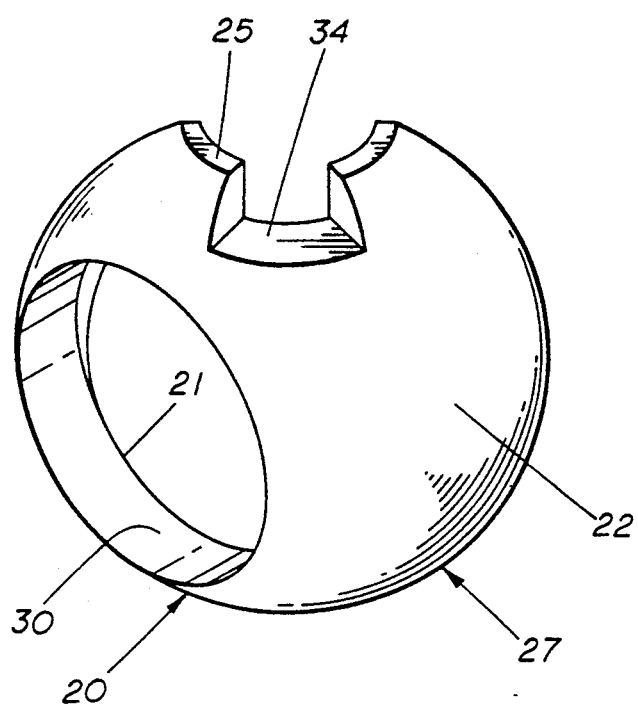
FIG. 3 is a perspective view of the valve element present invention.

The configuration of the valve element 20 as shown in FIGS. 1, 2, 3 can best be depicted as a spherical ball with inner and outer spherical wall surfaces 21,22 and a vertical central axis 17a. The spherical ball is then split into two parts to define a "hemi-ball" valve element 20 with an annular end wall surface 24 (see FIG. 2). The half ball or "hemi-ball" is then truncated at the top by a horizontal plane 25 which is normal to the central vertical axis 17a. The half ball is also truncated at the bottom by a horizontal plane 27 which is normal to the central axis 17a. Thus, the structure is a half ball member which is truncated by upper and lower planes 25,27 which are normal to a central vertical axis 17a. The half ball member may then be further considered as divided by a vertical plane into two quarter segments, with one of the quarter segments containing a cylindrical opening 30 which aligns, in one position of the ball member in the valve body, with the flow passages 13,14. The other quarter segment presents an external smooth sealing surface for sealing on an annular valve seat. To rotate the half ball member or valve element 20, a radially extending notch 34 is provided in the upper portion of the ball member and the notch 34 cooperates with a lug 36 on a drive plate 37 (FIG. 1) to rotate or drive the ball member or valve element through an angle of 90° to open and to close the valve. In FIG. 2, there is a dashed line 34a which illustrates a central location of the lug 36 relative to the axis 15 for the opening 30 of the valve element. The opening 30 is angularly displaced 45° from the lug slot 34 so that a mechanical advantage is provided when opening the valve from a closed position.

The valve element 20 is supported by a core member 95 where the core member has an outer spherical surface portion 95a (see FIG. 2) which slidably supports the valve element 20. The core member 95 has an outer spherical configuration with truncated top and bottom flat surfaces and a central opening.

As can be seen in FIG. 2, the ball member 20 can be rotated 90° from a valve open position where one part 24a of the end surface 24 on the valve element 20 engages a vertical stop face 38 on a wedge member 39 to a valve closed position where a diametrically disposed part 24b of the end surface 24 on the valve element 20 engages a vertical stop face 40 on the wedge member 39.

Figure 4:
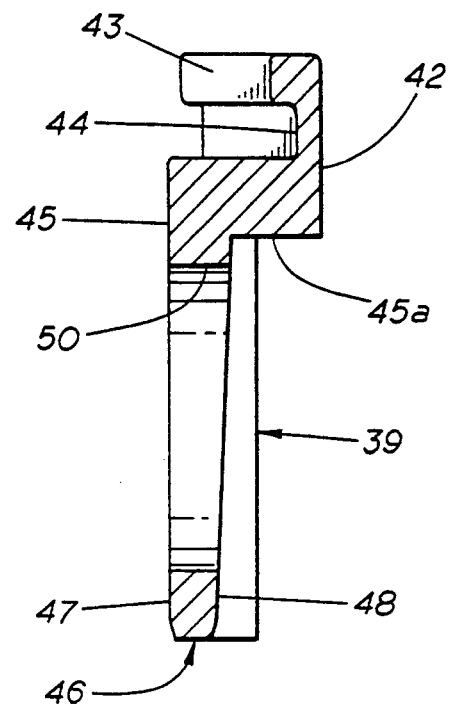
FIG. 4 is a view in cross section taken along line 4—4 of the wedge member shown in FIG. 6.
Figure 5:
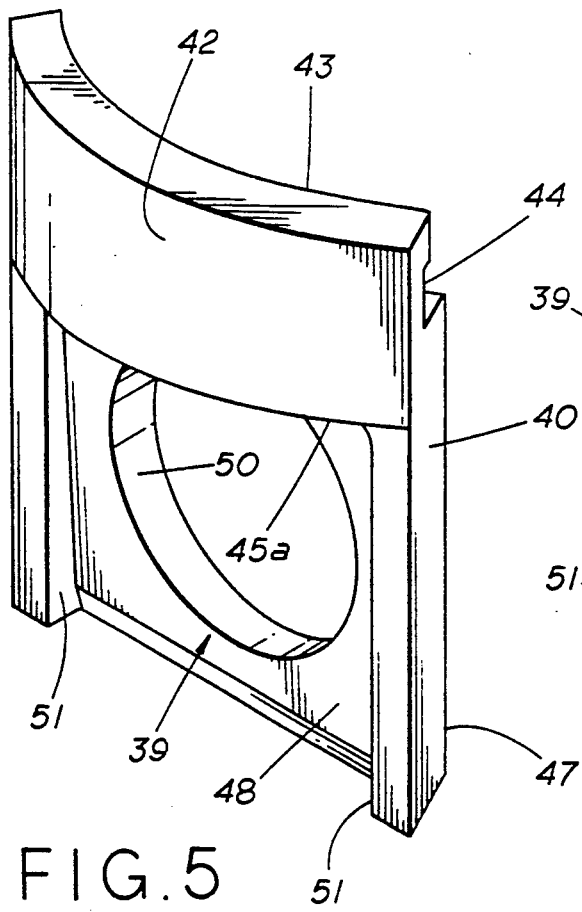
FIG. 5 is a perspective view of the wedge member of FIG. 6.
Figure 6:
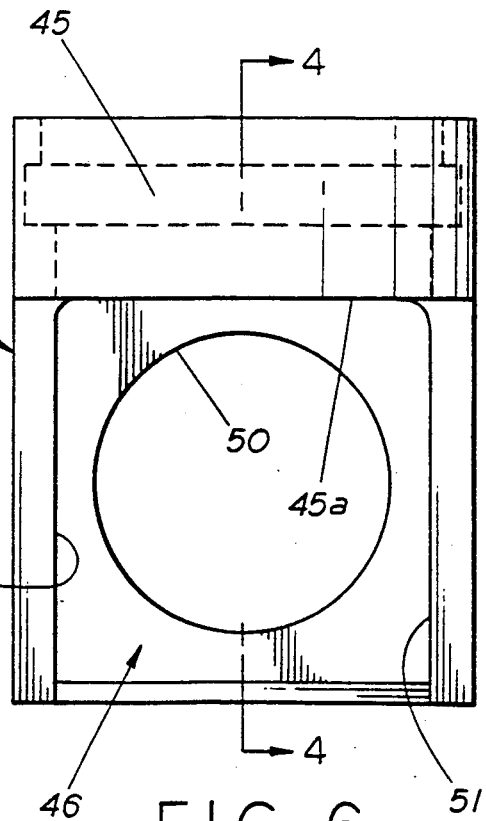
FIG. 6 is a one face view of a wedge member used in the valves of the present invention.

The wedge member 39 which is mounted in the valve chamber adjacent the outlet 14 is shown in three views in FIGS. 4–6 and includes a generally arcuate cylindrical wall at an upper end where the wall has an outer wall surface 42 and an inner arcuately curved wall surface 43. In the inner wall surface 43 there is a latching groove 44 of generally rectangular cross section. The arcuate cylindrical wall extends through an angle of 90° and terminates with the vertical end stop faces 38,40 (see FIG. 2). Below the upper cylindrical wall is a transverse connecting section 45 which connects to a depending vertical wall 46. The wall 46 has a vertical forward planar surface 47 along a vertical plane and a rearward tapered surface 48 along an inclined plane to define a tapered element. A circular opening 50 in the wall 46 aligns with the passages 13,14 and the surface 48 is recessed to form parallel side surfaces 51 (see FIG. 2).

Figure 12:
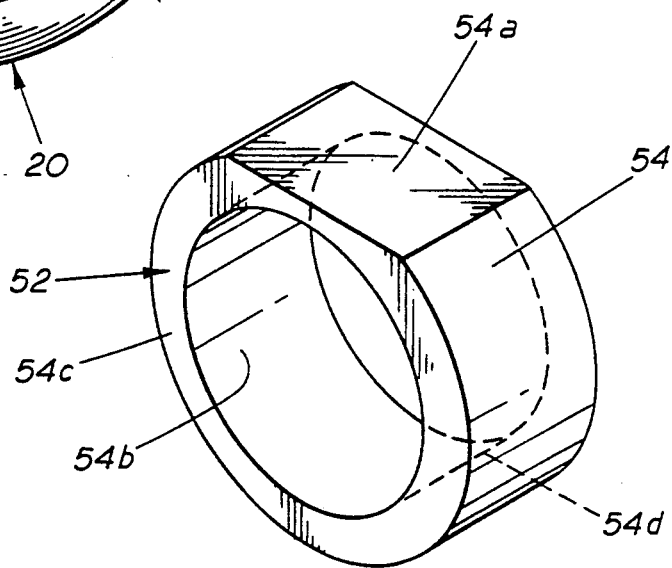
FIG. 12 is a perspective view of the spacer element to illustrate its configuration.

Referring to FIG. 1 and FIG. 2, the wedge member 39 is disposed in the valve body with its tapered surface 48 in engagement with a tapered surface 52 on a tubular spacer element 54. The tapered surface 52 is in an inclined plane relative to vertical to conform to the inclined surface 48. The spacer element 54 is received in a counterbore 56 in the outlet passage 14 and cooperates with the wedge element 39 to maintain the forward vertical wedge surface 47 at a fixed location along the axis 15. The spacer element 54 has a "D" shaped outer profile which acts at the stop position for the wedge member 39 to insure that the bore 50 lines up with the passages 13 and 14. (See FIG. 12) The upper flattened surface 54a of the spacer element 54 engages a transverse flat surface 45a on the wedge element 39 (see FIGS. 4–6). The transverse diametrical surface points 54c,54d engage the side surfaces 51 in the wedge element 39.

Figure 7:
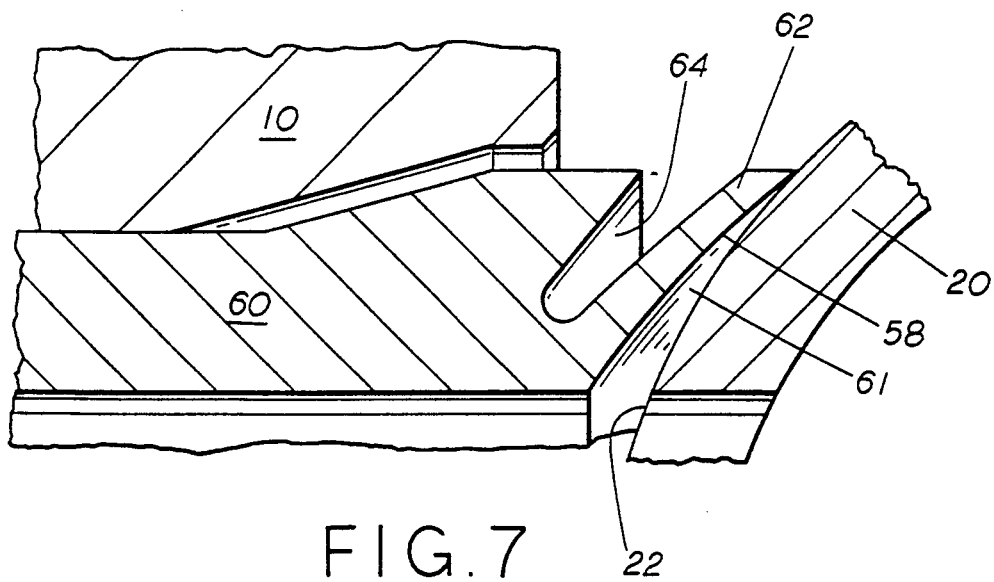
FIG. 7 is a fragmentary view in cross section to illustrate a sealing mechanism between the spherical sealing surface and a sealing seat.

As shown in FIG. 1 and FIG. 2, the forward or outer spherical surface 22 of the valve element 20 engages an annular spherical seal surface 58 on a tubular seating member 60 mounted in an enlarged diameter portion of the inlet passage 13. Referring briefly to FIG. 7, in a preassembly or preloaded condition, the curvature of the spherical surface 22 is the same as the curvature of the sealing surface 58 on an annular sealing lip portion 62 of the seating member 60 but inclined relative thereto. The lip portion 62 is formed by an annular recess 64 adjacent to the end of the seating member 60 and the top 63 of the lip is disposed to engage the surface of the valve element in annular contact therewith about the opening 30. When the valve element 20 is moved axially along the axis 15 relative to the seating member 60, the metal lip 62 flexes until the surfaces 22 and 58 are in conforming engagement in a metal-to-metal sealing condition with the lip 62 providing a resilient biasing force to maintain the contact of the surfaces 22 and 58.

Referring again to FIGS. 1 and 2, the seating member 60 has an external annular groove 66 midway of its length which receives a centralizing ring for urging the seating member 60 to a central position in the bore 68 which is an enlarged diameter coaxial extension of passage 13. The bore 70 of the seating member is aligned with the inlet passage 13 and is of equal diameter therewith. The end surfaces 72,74 of the seating member 60 are annular 45° bevels, inwardly and outwardly facing respectively, which form a generally pointed annular end. (See FIG. 8). The valve body has an internal recess 76 adjacent to the bore 68 intermediate the enlarged diameter portion of the inlet 13 and its enlarged diameter bore portion 68 and in a facing relationship to the outward facing annular bevel 74. The valve body 10 is provided with similar annular beveled surfaces 78,80. The facing surfaces 72 and 78 which face inwardly toward the valve passage form an inner annular "V" shaped sealing groove 82 and the outward facing surfaces 74 and 80 form an outer annular "V" shaped groove which opens to the annular recess 76.

Figure 8:
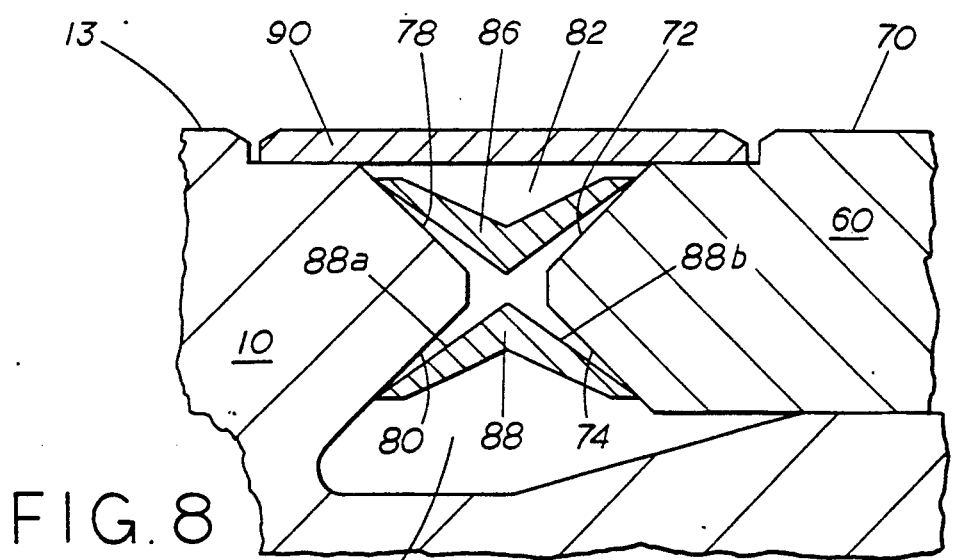
FIG. 8 is a fragmentary view in cross section to illustrate a sealing mechanism between the valve body and a sealing seat member.

Referring now to FIG. 8, an enlarged detail is shown for the recess formed by the inner groove 82 and for the recess 76. The parts are shown in an "unloaded" condition in FIG. 8 where the recess 82 contains an annular "V" shaped resilient metal sealing means 86 and the recess 76 contains an annular "V" shaped resilient metal sealing means 88. The sealing means 86 and 88 are described in detail in a co-pending application Ser. No. 635,568, filed Nov. 8, 1989. Briefly, the sealing means 86 and 88 are sealing rings with a generally V shaped configuration in cross section which have a larger included angle between the outer surfaces 88a,88b of the legs or "wings" of the sealing ring than the 90° angle formed between the beveled surfaces 74 and 80. Where the seating member 60 is moved axially relative to the valve body 10, the sealing means 86,88 will be flexed and the surfaces 88a,80 and the surfaces 88b and 74, for example, will be urged into metal-to-metal conforming contact with the flexure of the sealing means 86,88 providing a sealing force. A tubular retainer member 90 in accommodating recesses in the valve body and seating member 60 provides for bore continuity between the passage 13 and the bore 70 of the seating member. If liquids should access the recess 82 or 76, the sealing means 86,88 provide a tight seal against liquid leakage in both directions.

Figure 10:
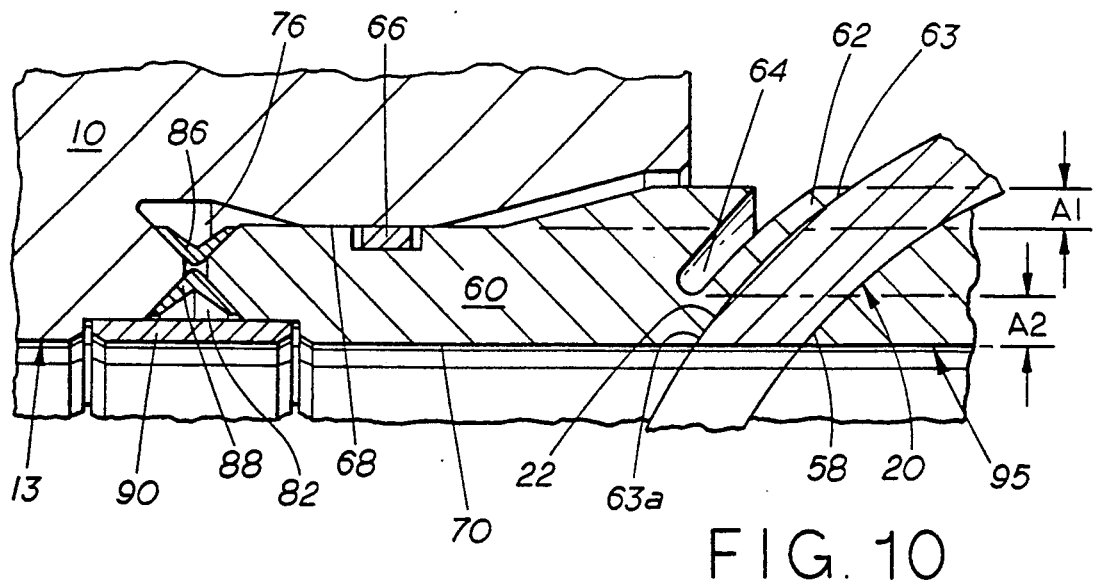
FIG. 10 is an enlarged fragmentary illustration of differential pressure areas in the valve.

With respect to the sealing effect of the sealing means 86 and 88, reference is made to an exaggerated detail in FIG. 10. When the valve element 20 is in a closed position, there is an annular area $A_1$ which is defined between the bore 68 and the contact point of the circular tip 63 of the seat 62 which provides a differential area for maintaining a seal on the valve seat when the external pressure on the valve seat is greater than the internal pressure. An annular area $A_2$ is defined by the contact point 63a of the seat 62 with the valve element 20 and the contact point of the sealing means 88 which provides a differential area for maintaining a seal on the valve seat when the internal pressure on the valve seat is greater than the external pressure.

Figure 11:
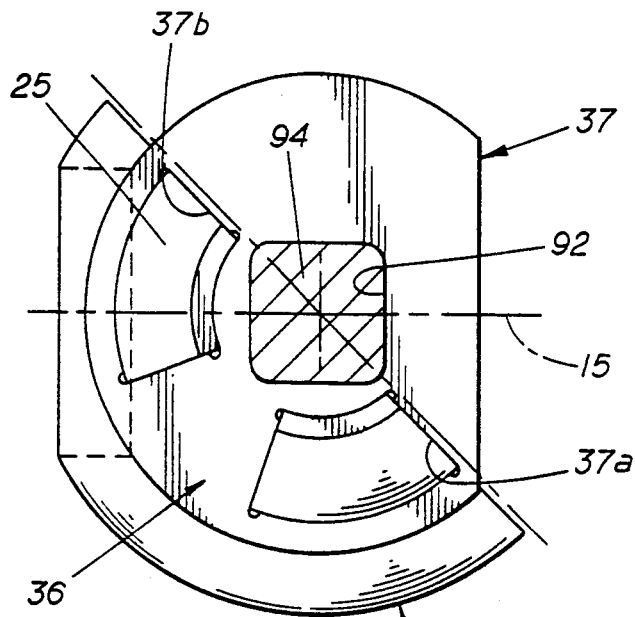
FIG. 11 is a top view of the drive plate.

Referring again to FIGS. 1 and 11, the drive plate 37 is attached or coupled to the top of the valve element 20 and has a center, square shaped socket 92 which receives a square shaped socket drive 94 on a drive stem 96. The socket 92 is aligned so that its sides are parallel to the axis 15 in the open and closed position of the valve. As shown in FIG. 11, the drive plate 37 has segmented openings 37a,37b to either side of the solid lug portion 36 which fits into the slot 34 of the valve element. The bottom surface 27 of the valve element 20 sits on a center post 92a of a cylindrically shaped bearing plate 92c. The bearing plate 92c has a recessed surface 92b to access liquid to the recess 76.

Figure 9:
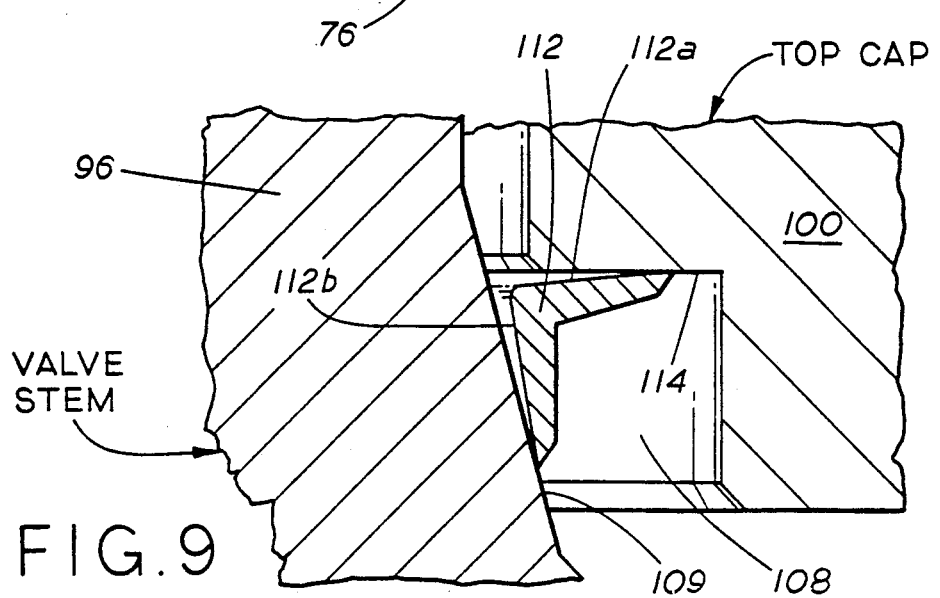
FIG. 9 is a fragmentary view in cross section to illustrate a sealing mechanism between the valve body and a valve cap.

The drive stem 96 of the valve element extends through a stem bore 98 in a top cap member 100. In the stem bore 98 is an annular recess 102 for a centralizing ring member and an annular recess 104 for a thrust bearing. At the lower end of the stem bore 98 is a recess and an outwardly tapered section 106 which is disposed adjacent to an annular sealing recess 108 formed by an enlargement of the stem bore 98. Disposed in the recess 108 is an annular resilient metal sealing means 112. As shown in enlarged fragmentary view in FIG. 9, the sealing means 112 is an annular V shaped member of resilient metal such as Inconel 718. The sealing means 112 has a "V" shaped configuration in radial cross section and an included angle between outer convergent surfaces 112a and 112b of about 81° while the included angle between a downward facing annular sealing surface 114 of the valve bonnet 100 and the sealing surface 109 of the tapered section 106 of the drive stem is 75°. When the top cap 100 is moved axially of the stem during assembly, the sealing means 112 moves from the "unloaded" positions shown in FIG. 9 to a loaded condition where the legs or "wings" of the sealing means 112 are flexed to exert a metal-to-metal sealing force between the surfaces 112a and 114 and between the surfaces 112b and 109. Internal pressure in the recess 108 will further energize the sealing effect of the sealing means. The sealing means 112 which is a rotative metal-to-metal seal is further described in a copending application Ser. No. 567,738, filed Aug. 15, 1990 (on the same date as this application by the same inventor).

The top cap member 100 is threadedly received in an opening in the top of the valve body 10 as shown by the threaded connection 120. On the lower end of the top cap member 100 is an annular lip part 122 with an annular lug part 124. The lug part 124 interfits with the lug recess 44 in the wedge member 39. Thus, in assembly the cylindrical wall of the wedge member 39 is confined between the cylindrical bore 130 which forms part of the opening in the top of the valve body and the lip part 122 and lug part 124 of the top cap 100.

The top cap 100 is pressure sealed with respect to the valve body by a "V" shaped annular sealing means 132 which is received in an external downwardly opening annular recess 133 formed in the cap 100. In the recess 133 is an annular sealing surface which is disposed at an angle of 90° with respect to another sealing surface formed in the valve body and between which the sealing means 132 is provided to establish a seal for basically the same type of seal as described with respect to FIG. 8. In assembly, the sealing means 132 is moved from an "unloaded" to a "loaded" condition by flexing the metal of the sealing means and providing a metal-to-metal seal.

It will be appreciated that in assembly, the attachment of the top cap 100 moves the wedge member 39 into a wedging relationship with the spacer 54 and the core member 95 in the sealing element 20. This produces an axial movement of the sealing element 20 and the seating member to pre-load the seals 86,88 and 62. When the top cap is in its final position, the seals 132 and 112 are pre-loaded and the bores 30 and 54a are aligned with the bores 13 and 14 (see FIG. 1) while the vertical stop surfaces 38 and 40 are aligned by the surface portions 54(c) and 54(d) (see FIG. 12) located in between the wedge surfaces 51.

As can be appreciated from FIG. 2 the ball member 20 can be rotated through one-quarter turn or 90° to open or close the passage 13. The surfaces 38 and 40 of the wedge member 39 provide a positive stop for the valve element.

From the foregoing description, it can be appreciated that the valve system of the present invention embodies metal-to-metal seals to provide a valve seat to body seal and also act as an energizing mechanism for the seat to sphere surface seal. The valve incorporates a single seat sealing mechanism to create a seat to spherical surface seal, irrespective of whether there is internal pressure or external pressure on the seat, when the valve is in the closed position.

When the valve mechanism is in the open position the metal seals, the valve seat, the valve element, the wedge and the spacer are energized by the V shaped seals which are subjected to axial compressive load by the introduction of the wedge member 39 between the core member 95 and the spacer element 54. The wedge is inserted and removed by utilizing the top cap which has a mating "tongue and groove" connection.

When the top cap is fully screwed into position in the valve body, the top cap energizes the metal-to-metal seal with the valve body, the metal-to-metal seal with the stem and energizes the metal-to-metal seals in the body/seat seal and seat to hemi-ball seal.

The valve element rotates coaxially with the valve stem to accomplish the opening/closing operations. The drive mechanism between the hemi-ball and the stem is via the drive plate which cooperates with drive lugs on the hemi-ball and the square drive pin on the bottom end of the stem.

The seat to hemi-ball seal mechanisms "flexes" the seal to contact the hemi-ball all along the contact face. This ensures that both the inner and outer most contact points are simultaneously in sealing contact with the hemi-ball (valve element 20).

To operate the valve mechanism from open to close, the drive stem 96 is rotated clockwise ninety (90) degrees from the full open position. The hemi-ball (valve element 20) rotates concentrically between the core member 95 and the seating member (which remain stationary) until the vertical end face 24 of the hemi-ball (valve element 20) contacts the cooperating stop face 40 of the wedge member 39 and the valve is in closed condition. When pressure is internal to the seating member 60 in the passage 13, the cavity and "downstream" line pressure in passage 14 is bled to zero. The sealing means 72 between the seating member and body 10 is subject to internal pressure and the resulting hydrostatic end loads will provide an increased seal between the sealing means 72 and the body 10 and the resultant thrust will urge the seating member to increased sealing contact with the hemi-ball (valve element 20). The core member 95, the member 39 and the spacer element 54 merely act to support the seal elements and hold the axial alignment. Cavity pressure cannot be trapped behind the core since there are no sealing elements to stop the cavity pressure from bleeding off.

To open the valve against differential pressure, the drive stem 96 is turned counterclockwise ninety (90) degrees to the fully open position. When the hemi-ball (valve element 20) has moved sufficiently to allow the hole 30 in it to break sealing engagement with the seating member, the pressure will be equalized across the system and the torque to operate the valve will drop significantly. The positioning of the drive lugs on the hemi-ball (valve element 20) creates a mechanical advantage when operating the hemi-ball (valve element 20) against differential pressures.

When the valve is closed and the differential pressure is on the "downstream" side (passage 14) of the seating member relating to the hemi-ball (valve element 20) seal, the sealing means 74 is subjected to external pressure which will cause the seating member to be urged toward the hemi-ball (valve element 20) by the differential pressure area and will cause the pressure to maintain the seat-to-hemi-ball sealing contact. The cavity pressure will cause "lift" on the valve stem 96 due to the sealing means connection. This thrust load is absorbed in the top cap by the thrust bearing. The thrust bearing has two functions: a) to hold the stem in position, and b) to reduce friction effect during rotation under differential cavity pressure.

In the present invention, the sealing means provide internal and external sealability of seat to body connection. The use of sealing means in conjunction with specific differential areas to create positive differential seal areas between the seat and hemi-ball so that either internal or external pressure will urge the seat to the hemi-ball and not vice versa. This means that the design relies on the flexure of the annular metal sealing rings to maintain the sealing mechanism.

The concentric hemi-spherical hollow ball is used as both the driver/seal mechanism. The position of the drive lugs provide a mechanical advantage when operating the hemiball from the closed/differential pressure position. The square drive at the lower end of stem in the drive plate allows axial "float" when the valve is in the closed position with the differential pressure. Valve does not rely on the seal elements being "locked" together axially in the closed position, but utilizes axial "float" to allow annular metal sealing rings to work properly whether pressure is present or not.

It will be apparent to those skilled in the art that various changes may be made in the invention without departing from the spirit and scope thereof and therefore the invention is not limited by that which is enclosed in the drawings and specifications, but only as indicated in the appended claims.

I claim:

1. A valve for controlling liquid flow comprising:
   a valve body having flow passages disposed along a central axis for coupling to pipe members and a central valve portion with a hollow interior disposed intermediate of said passages, said central valve portion being arranged to be closed by a cap member;
   a sealing system in said valve body for a spherically shaped metal sealing element and a spherically shaped annular metal seat element where the sealing element can be rotated about a transverse axis between a first position where the sealing element closes off the opening of said seat element and a second position where an opening in said sealing element is in fluid communication with both flow passages;
   said seat element being a tubular member slidably mounted in said valve body for axial movement relative to said central axis, said tubular member having a flexible lip portion at one end to provide flexure and a metal-to-metal seal in response to axial force along said central axis and having an annular configured element end surface at its other end in facing relationship to an annular configured body end surface in said valve body,
   said configured element end surface and said configured body end surface respectively having beveled portions arranged to define an angular shape in cross section with an apex-to-apex relationship to one another;
   resilient annular metal sealing means disposed between said configured end surfaces and adapted to provide flexure and a metal-to-metal seal in response to axial force along said central axis;
   said annular metal sealing means being ring members with a V shaped cross section and having outer surface portions to form an angular shape in cross section with an apex-to-apex relationship to one another; and
   means cooperating with said valve body and said sealing element for developing an axial force along said central axis for flexing said seat element and said sealing means and for providing metal-to-metal sealing relationships.

2. The valve as set forth in claim 1 wherein said means cooperating with said valve body includes a wedge member disposed between said valve body and said sealing element.

3. The valve as set forth in claims 1 or 2 wherein said metal sealing element is one-half of a ball element having inner and outer parallel curved walls, and where said opening is in a quarter segment of said ball element, and drive means connected to said ball element for rotating said ball element about said transverse axis.

4. The valve as set forth in claim 3 where ball member has an upper truncated surface disposed along a plane transverse to said transverse axis, and drive connecting means including a drive slot in said ball member extending transversely into said ball element.

5. The valve as set forth in claim 4 wherein said drive connecting means includes a drive plate member for engaging said drive slot.

6. The valve as set forth in claim 5 wherein said drive plate member has a square shaped centrally located socket recess where at least two sides surfaces of said pocket recess are parallel to the axis of said opening.

7. The valve as set forth in claim 6 wherein said drive socket is sized to receive a driver stem member where said stem member extends through an opening in said cap member where said cap member closes off said hollow interior; and
   resilient annular metal sealing means disposed between said cap member and said valve body and between said stem member and said cap member for providing metal-to-metal sealing means.

8. A top-entry valve comprising:
   a valve body having a central chamber therein and a pair of axially aligned inlet and outlet passages along a central axis, said passages being in fluid communication with said chamber and defining a flow conduit through said valve;
   a tubular metal valve seat member mounted in an enlarged diameter portion of said inlet passage of said valve body in coaxial alignment with said inlet passage and adapted for limited axial movement therein, said valve seat member having a flexible annular lip portion formed coaxially about one end of the tubular seat member and providing an annular sealing surface;
   a metal valve element transversely mounted in said valve chamber for rotary movement between a first position wherein said valve element closes off said flow passage and a second position wherein said flow passage is open, said valve element having a spherical sealing surface which in the closed position of said valve element is disposed in engagement with said annular sealing surface of the seat member and in response to force in the axial direction of said flow passage induces the deformation of said lip portion to establish a seal between said valve seat member and said valve element;
   said valve body having an annular beveled surface coaxially formed in the enlarged diameter portion of said inlet passage and said tubular seat member having a coaxial annular beveled surface at the other end thereof disposed adjacent to said valve body beveled surface;
   resilient metallic sealing ring means disposed coaxially about said adjacent annular beveled surfaces and in annular contact with each of said beveled surfaces, and resilient metallic sealing ring being responsive to an axially directed movement of said tubular seat member towards the annular beveled surface of the valve body which induces the flexure of said sealing ring and establishes a fluid-tight sealing engagement of said sealing ring with said beveled surfaces; and force means cooperating with said valve body and said valve element for developing a force in the axial direction of said flow passage for inducing the flexure of said valve seat tip portion and said metallic sealing ring for establishing metal-to-metal seals between said seat member and valve elements and between said seat member and said valve body.

9. The apparatus as set forth in claim 8 wherein said force means includes a wedge member disposed between said valve body and said valve element.

10. The apparatus as set forth in claim 9 and further including a cap member for closing off said central chamber and a valve stem extending through said cap member and attached to said metal valve element, said cap member being coupled to said wedge member for moving said wedge member transversely to said central axis for applying said force in the axial direction.

11. The apparatus as set forth in claim 10 and further including annular metal sealing means disposed between said cap member and said valve stem and between said cap member and said valve body.

12. The apparatus as set forth in claim 8 and further including a cap member for closing off said central chamber and a valve stem extending through said cap member and attached to said valve element, and annular metal sealing means disposed between said cap member and said valve stem and between said cap member and said valve body.

13. A valve for controlling liquid flow comprising:
a valve body having an inlet passage and an outlet passage disposed along a central axis for coupling to pipe members and a central valve portion with a hollow interior arranged to be closed by a cap member;

a sealing system in said valve body for a valve element having a spherically shaped metal sealing face and a spherically shaped annular seat element where the valve element can be rotated about a transverse axis between a first position where the opening of said seat element is closed off by said sealing face and a second position where the opening of said seat element is in fluid communication with said passages;

said seat element being a tubular member slidably mounted in said valve body for axial movement relative to said central axis, said tubular member having a flexible lip portion at one end thereof to provide flexure and a metal-to-metal seal with said sealing face in response to axial force along said central axis, said tubular member further having a first annular configured element end surface at its other end where said configured end surface is in facing relationship to a second annular configured body end surface in said valve body;

resilient annular metal sealing means disposed between said first and second configured end surfaces and adapted to flex and to provide a metal-to-metal seal in response to an axial force in one direction along said central axis; and means cooperating with said valve body and said valve element for developing an axial force in an opposite direction along said central axis for flexing said flexible lip portion on said seat element and for flexing said metal sealing means where such flexing provides metal-to-metal sealing relationships and develops an axial force in said one direction for maintaining said valve element in contact with said seat element.

14. The valve as set forth in claim 13 wherein a said valve element and said seat element have a differential pressure area with respect to said seat element to maintain a pressure seal.

15. The valve as set forth in claim 14 wherein said configured end surfaces define at least one V-shaped recess and said resilient metal sealing means includes at least one annular V-shaped sealing members disposed in at least one V-shaped recess.

16. The valve as set forth in claim 15 wherein V-shaped grooves are disposed apex to apex and annular V-shaped sealing members are disposed in each of said grooves.

17. The valve as set forth in claim 13 wherein said valve element is a half ball member with a truncated upper surface disposed normal to said transverse axis.

18. The valve as set forth in claim 17 wherein said half ball member defines end surface portions in a transverse plane to said central axis and disposed at an angle of 180° from one another, and further including stop means for engaging said end surface portions respectively in an open and in a closed condition of the valve.

19. A valve for controlling liquid flow comprising:
a valve body having flow passages disposed along a central axis for coupling to pipe members and a central valve portion with a hollow interior arranged to be closed by a cap member;

a spherically shaped metal sealing element and a spherically shaped annular metal seat element where said sealing element can be rotated about a transverse axis between a first position where the sealing element closes off the opening of said seat element and a second position where an opening in said sealing element is in fluid communication with said flow passages;

said metal sealing element being one-half of a hollow ball element having inner and outer parallel curved walls where said opening is in a quarter segment of said ball element;

drive means connected to said ball element for rotating said ball element about said transverse axis;

resilient annular metal sealing means for pressure sealing of said metal sealing element and said seat element relative to one another; and force means for moving said seat element into said sealing element for developing said pressure sealing, said force means including an elongated wedge member disposed between said valve body and said valve element and a tubular spacer member in a flow passage, said tubular member being configured for non-rotative location in such flow passage and having an inclined tapered surface for cooperation with said wedge member.

20. The valve as set forth in claim 19 where ball member has an upper truncated surface disposed along a plane transverse to said transverse axis; and
drive connecting means in said upper truncated surface including a drive slot in said ball member extending transversely into said ball element.

21. The valve as set forth in claim 19 wherein said drive connecting means includes a drive plate member for engaging said drive slot.

22. The valve as set forth in claim 21 wherein said drive plate member has a square shaped centrally located socket recess where at least two sides surfaces of said socket recess are parallel to the axis of said opening.

23. The valve as set forth in claim 22 wherein said socket recess is sized to receive a driver stem member where said stem member extends through an opening in said cap member where said cap member closes off said hollow interior, said cap member being coupled to said wedge member for locating said wedge member relative to said spacer member.

24. The valve as set forth in claim 20 and wherein the cap member for closing off said hollow interior includes a cap member opening, drive means for rotating said sealing element about said transverse axis, said drive means extending through said cap member opening, and means for coupling said cap means to said wedge member for locating said wedge member relative to said spacer member.

25. The valve as set forth in claim 20 wherein said wedge member provides stop surfaces for limiting the rotation of said sealing element.

26. The valve as set forth in claim 25 wherein said wedge member is keyed to said spacer member to locate said stop surfaces in said valve body.

27. A valve for controlling liquid flow comprising:

a valve body having an inlet passage and an outlet passage disposed along a central axis for coupling to pipe members and a central valve portion with a hollow interior arranged to be closed by a cap member;

a sealing system in said valve body for a valve element where said valve element is a half ball member with a truncated upper surface disposed normal of said transverse axis; said half ball member having end surface portions in a transverse plane to said central axis and disposed at an angle of 180° from one another, said ball member further having a spherically shaped metal sealing face and a spherically shaped annular seat element where the valve element can be rotated about a transverse axis between a first position where the opening of said seat element is closed off by said sealing face and a second position where the opening of said seat element is in fluid communication with said passages;

said seat element being a tubular member slidably mounted in said valve body for axial movement relative to said central axis, said tubular member having a flexible lip portion at one end thereof to provide flexure and a metal-to-metal seal with said sealing face in response to axial force along said central axis, said tubular member further having a first end surface at its other end where said first end surface is in facing relationship to a second body end surface in said valve body;

resilient means disposed between said first and second end surfaces and adapted to provide an axial force in one direction along said central axis; and force means cooperating with said valve body and said valve element for developing an axial force in an opposite direction along said central axis for flexing said flexible lip portion on said seat element where such flexing provides metal-to-metal sealing relationships and develops the axial force in said one direction for maintaining said valve element in contact with said seat element, said force means including an elongated wedge member disposed between said valve body and said valve element, and stop means on said wedge member for engaging said end surface portions respectively in an open and in a closed condition of the valve.

28. A valve for controlling liquid flow comprising:

a valve body having an inlet passage and an outlet passage disposed along a central axis for coupling to pipe members and a central valve portion with a hollow interior arranged to be closed by a cap member;

a sealing system in said valve body for a valve element having a spherically shaped metal sealing face and a spherically shaped annular seat element where the valve element can be rotated about a transverse axis between a first position where the opening of said seat element is closed off by said sealing face and a second position where the opening of said seat element is in fluid communication with said passages; said valve element being a half ball member with a truncated upper surface disposed normal to said transverse axis and said valve element having a valve element opening along a first axis normal to said transverse axis and wherein said upper surface has a notch with a second axis disposed normal to said transverse axis and wherein said first and second axis are displaced from one another by an angle of 45°;

said seat element being a tubular member slidably mounted in said valve body for axial movement relative to said central axis, said tubular member having a flexible lip portion at one end thereof to provide flexure and a metal-to-metal seal with said sealing face in response to axial force along said central axis, said tubular member further having a first end surface at its other end where said first end surface is in facing relationship to a second body end surface in said valve body;

resilient means disposed between said first and second end surfaces and adapted to provide an axial force in one direction along said central axis; and force means cooperating with said valve body and said valve element for developing an axial force in an opposite direction along said central axis for flexing said flexible lip portion on said seat element where such flexing provides metal-to-metal sealing relationships and develops the axial force in said one direction for maintaining said valve element in contact with said seat element, said force means including an elongated wedge member disposed between said valve body and said valve element.

29. A valve for controlling liquid flow comprising:

a valve body having an inlet passage and an outlet passage disposed along a central axis for coupling to pipe members and a central valve portion with a hollow interior arranged to be closed by a cap member;

a sealing system in said valve body for a valve element where said valve element is a half ball member; said half ball member having end surface portions in a transverse plane to said central axis and disposed at an angle of 180° from one another, said ball member further having a spherically shaped metal sealing face and a spherically shaped annular seat element where the valve element can be rotated about a transverse axis between a first position where the opening of said seat element is closed off by said sealing face and a second position where the opening of said seat element is in fluid communication with said passages;

said seat element being a tubular member slidably mounted in said valve body for axial movement relative to said central axis, said tubular member having a flexible lip portion at one end thereof to provide flexure and a metal-to-metal seal with said sealing face in response to axial force along said central axis, said tubular member further having a first end surface at its other end where said first end surface is in facing relationship to a second body end surface in said valve body;

resilient means disposed between said first and second end surfaces and adapted to provide an axial force in one direction along said central axis; and force means cooperating with said valve body and said valve element for developing an axial in an opposite direction along said central axis for flexing said flexible lip portion on said seat element where such flexing provides metal-to-metal sealing relationships and develops the axial force in said one direction for maintaining said valve element in contact with said seat element, said force means including an elongated wedge member disposed between said valve body and said valve element, and stop means on said wedge member for engaging said end surface portions respectively in an open and in a closed condition of the valve.

* * * * *